US012006439B2

(12) United States Patent
Yamamoto et al.

(10) Patent No.: US 12,006,439 B2
(45) Date of Patent: Jun. 11, 2024

(54) OPTICAL MEMBER, OPTICAL DEVICE AND COATING LIQUID

(71) Applicant: CANON KABUSHIKI KAISHA, Tokyo (JP)

(72) Inventors: Shuhei Yamamoto, Tokyo (JP); Tomonari Nakayama, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 928 days.

(21) Appl. No.: 16/823,824

(22) Filed: Mar. 19, 2020

(65) Prior Publication Data

US 2020/0308415 A1 Oct. 1, 2020

(30) Foreign Application Priority Data

Mar. 27, 2019 (JP) .................. 2019-061171
Mar. 6, 2020 (JP) .................. 2020-038643

(51) Int. Cl.
| | | |
|---|---|---|
| G02B 1/118 | (2015.01) | |
| C03C 17/00 | (2006.01) | |
| C09D 1/00 | (2006.01) | |
| C09D 7/20 | (2018.01) | |
| C09D 7/62 | (2018.01) | |
| C23C 18/12 | (2006.01) | |
| G03B 17/14 | (2021.01) | |

(52) U.S. Cl.
CPC .............. *C09D 1/00* (2013.01); *C09D 7/20* (2018.01); *C09D 7/62* (2018.01); *C23C 18/1212* (2013.01); *C23C 18/127* (2013.01); *G02B 1/118* (2013.01); *C03C 17/009* (2013.01); *C23C 18/1254* (2013.01); *G03B 17/14* (2013.01)

(58) Field of Classification Search
CPC .... C09D 1/00; C09D 7/20; C09D 7/62; C23C 18/1212; C23C 18/127; C23C 18/1254; G02B 1/118; C03C 17/009; G03B 17/14; C08K 3/36
See application file for complete search history.

(56) References Cited

U.S. PATENT DOCUMENTS

| | | | |
|---|---|---|---|
| 10,564,321 B2 | 2/2020 | Nakayama et al. | |
| 2010/0068519 A1* | 3/2010 | Holland ............... | C01B 33/126 |
| | | | 428/402 |

(Continued)

FOREIGN PATENT DOCUMENTS

| | | |
|---|---|---|
| JP | 2001-233611 A | 8/2001 |
| JP | 2008-139581 A | 6/2008 |

(Continued)

OTHER PUBLICATIONS

Heptafluorobutyric acid Product Information; Author Unknown, Sigma (Year: 2003).*

(Continued)

*Primary Examiner* — Nathan L Van Sell
(74) *Attorney, Agent, or Firm* — Venable LLP

(57) ABSTRACT

An optical member having a porous layer having both low scattering and film strength is provided. The optical member is an optical member, having a porous layer in which a plurality of silicon oxide particles are bound with an inorganic binder on a base material, and the porous layer contains a fluorine-containing organic acid having 5 or more and 11 or less fluorine atoms in one molecule.

8 Claims, 2 Drawing Sheets

(56) References Cited

U.S. PATENT DOCUMENTS

| | | | |
|---|---|---|---|
| 2011/0026122 A1* | 2/2011 | Tanaka | G02B 1/111 |
| | | | 359/586 |
| 2013/0094093 A1* | 4/2013 | Tanaka | C03C 17/007 |
| | | | 359/642 |
| 2013/0146100 A1* | 6/2013 | Saito | C07F 7/1804 |
| | | | 134/26 |
| 2016/0108250 A1* | 4/2016 | Tamura | B32B 27/20 |
| | | | 522/42 |
| 2017/0243989 A1 | 8/2017 | Koyo et al. | |
| 2019/0187335 A1 | 6/2019 | Nakayama | |
| 2020/0068106 A1 | 2/2020 | Tatsuno et al. | |

FOREIGN PATENT DOCUMENTS

| | | |
|---|---|---|
| JP | 2009-73170 A | 4/2009 |
| JP | 2016-109999 A | 6/2016 |
| WO | 2016/051750 A1 | 4/2016 |

OTHER PUBLICATIONS

ChemBK.com, Perfluoropropionic Acid; Aithor Unknown (Year: 2015).*
Watanabe et al., U.S. Appl. No. 16/700,042, filed Dec. 2, 2019.
Notice of Reasons for Refusal in Japanese Application No. 2020-038643 (Oct. 2023).

* cited by examiner

OPTICAL MEMBER, OPTICAL DEVICE AND COATING LIQUID

BACKGROUND OF THE INVENTION

Field of the Invention

The present invention relates to an optical member having an antireflection film which has low scattering and is excellent in film strength, an optical device using the same, and a coating liquid for forming the antireflection film.

Description of the Related Art

It is known conventionally that an antireflection layer wherein an optical film is layered as a monolayer, or optical films having different refractive indices are layered as a plurality of layers at a thickness of tens to hundreds of nanometers is formed to control reflection at the light incidence and outgoing interface of an optical member. To form these antireflection layers, vacuum film-forming methods such as vapor deposition and sputtering and wet film-forming methods such as dip coating and spin coating are used.

It is known that an inorganic material such as silica, magnesium fluoride or calcium fluoride; or an organic material such as a silicone resin or an amorphous fluororesin which has a low refractive index and is a transparent material is used for a material used for the outermost layer of an antireflection layer.

The development of low refractive index layers wherein the refractive indices are reduced to 1.3 or less by forming vacant spaces in layers such as silica or magnesium fluoride and incorporating regions of air (refractive index 1.0) to control the reflectance lower has been advanced in recent years. A technique for applying/drying a dispersion of a silicon oxide particle has been widely used for forming a low refractive index layer containing vacant spaces inside.

Meanwhile, it is known that when a silica particle is used for an optical member, a problem occurs as to transparency or appearance. It is because a silica particle has poor affinity with an organic solvent or an organic polymer mixed with the silica particle, aggregates at the time of preparing a paint and causes scattering. Japanese Patent Application Laid-Open No. 2009-73170 discloses a method for forming a porous layer without scattering by forming a film with a paint containing no organic polymer and suppressing aggregation to solve this problem.

However, the porous layer described in Japanese Patent Application Laid-Open No. 2009-73170 does not contain a binder represented by organic polymers to suppress scattering. While a low refractive index and transparency are required for a porous layer provided as an antireflection film on the surface of an optical member, strength is also required as a film. Therefore, a film not containing a binder had a problem that the film strength was insufficient, and low scattering and the film strength were incompatible.

The present invention has been completed in view of the above, and provides an optical member provided with a porous layer which has low scattering and is excellent in film strength, an optical device using the same, and a coating liquid for forming the porous layer.

SUMMARY OF THE INVENTION

An optical member which solves the above-mentioned problem is characterized in that the optical member has a porous layer on a base material, and the porous layer has a silicon oxide particle and an inorganic binder and has a fluorine-containing organic acid.

A coating liquid according to the present invention is a coating liquid for forming a porous layer, and is characterized in that the coating liquid contains a silicon oxide particle, an inorganic binder and an organic solvent, and the silicon oxide particle has a fluorine-containing organic acid on the surface.

According to the present invention, a porous layer which has low scattering and is excellent in film strength, an optical device using the same, and a coating liquid for forming the porous layer can be provided.

Further features of the present invention will become apparent from the following description of exemplary embodiments with reference to the attached drawings.

DESCRIPTION OF THE EMBODIMENTS

Preferred embodiments of the present invention will now be described in detail according to the accompanying drawings.

(Porous Layer)

Figure 1:
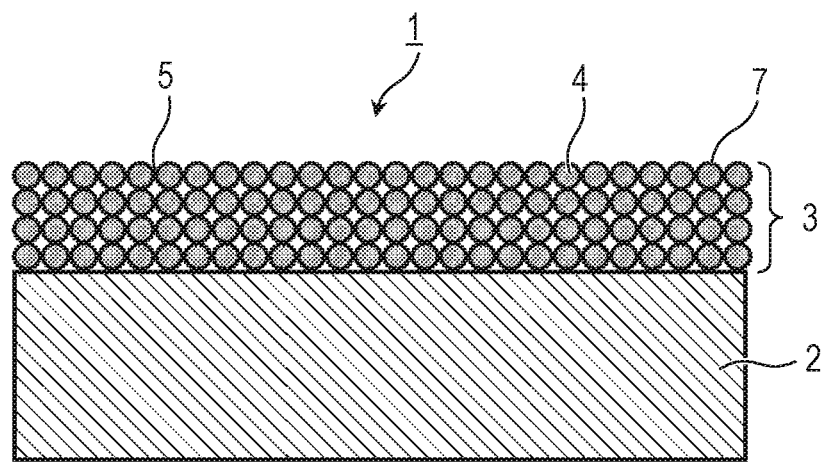
FIG. 1 is a schematic diagram illustrating one embodiment of an optical member of the present invention.

FIG. 1 is a schematic diagram illustrating one embodiment of an optical member of the present invention. In the same figure, an optical member 1 according to the present invention is an optical member 1 in which a porous layer 3 is formed on a base material 2 as an antireflection film. The porous layer 3 has a silicon oxide particle 4 and an inorganic binder 5. The silicon oxide particle 4 has a fluorine-containing organic acid 7 on the surface. Silicon oxide particles 4 preferably constitute a layer formed with a plurality of tiers of silicon oxide particles 4 piled on the surface of the base material 2.

Figure 2:
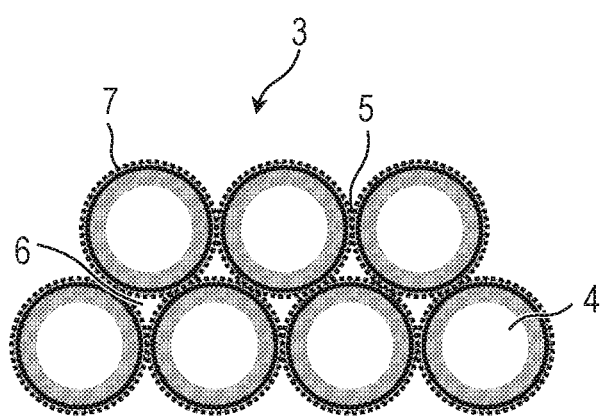
FIG. 2 is a schematic diagram illustrating partially enlarging the porous layer of one embodiment of the optical member of the present invention.
Figure 3:
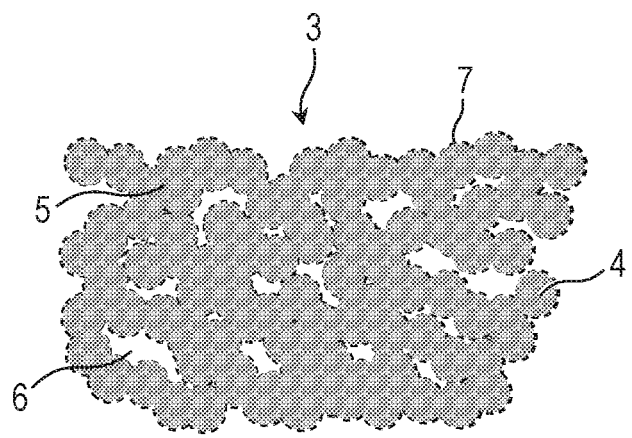
FIG. 3 is a schematic diagram illustrating one embodiment of the optical member of the present invention.

FIGS. 2 and 3 are schematic diagrams illustrating states in which the porous layer 3 of the optical member of the present invention is enlarged partially. FIG. 2 illustrates the case where silicon oxide particles 4 are hollow silicon oxide particles, and FIG. 3 illustrates the case where silicon oxide particles 4 include chain-like silicon oxide particles (silicon oxide particle connected body). As illustrated in FIGS. 2 and 3, the silicon oxide particles 4 constituting the porous layer 3 are bound with the inorganic binder 5, and the porous layer 3 contains a plurality of vacant spaces 6 among a plurality of silicon oxide particles 4. The porous layer 3 contains the fluorine-containing organic acid 7 wherein the number of fluorine atoms in one molecule is 5 or more and 11 or less.

The porous layer 3 including the silicon oxide particles 4 is formed by piling a plurality of tiers of the silicon oxide particles 4 aligned on the surface of the base material 2.

To obtain a porous layer 3 which has low scattering and is excellent in film strength, a state in which the arrangeability of the silicon oxide particles 4 is in good order is preferable. The arrangeability of the silicon oxide particles 4 mainly changes depending on the dispersion state of the silicon oxide particles 4 in a coating liquid for forming the porous layer 3 and the dispersion state of the silicon oxide particles 4 when the coating film is formed.

When the silicon oxide particles 4 in the coating liquid are not influenced by a dispersion medium or the inorganic binder 5 and are fully dispersed, the silicon oxide particles 4 are easily arranged. However, when the silicon oxide particles 4 are dispersed while aggregating slightly due to the influence of the dispersion medium or the inorganic binder 5, the arrangeability deteriorates.

The flow of the silicon oxide particles 4 due to the volatilization, drying or concentration of the solvent when the coating liquid is applied to the base material 2 to form a coating film also influences the arrangeability greatly. Even though the dispersion state of the silicon oxide particles 4 in the coating liquid is good, the arrangeability of silicon oxide particles 4 is disordered when the silicon oxide particles 4 aggregate at the time of forming and drying the coating film, and openings among the silicon oxide particles 4 are large, and voids in the plane direction of the base material are large when the coating film is formed. Therefore, scattering is high in visible light. The coating film is formed not in the state in which the silicon oxide particles 4 are aligned and accumulated but in the state in which silicon oxide particles 4 are out of position, the stress distribution of the coating film is ununiform, and the strength of the film is not fully maintained thereby.

As mentioned above, the present invention enables forming the porous layer 3 in a state in which the silicon oxide particles 4 are aligned and accumulated with the arrangeability of the silicon oxide particles 4 in order using the silicon oxide particles 4 wherein the fluorine-containing organic acid 7 is added to the surface.

The above-mentioned fluorine-containing organic acid 7 enables not only improving the dispersibility of the silicon oxide particles 4 in the coating liquid but also forming a coating film while maintaining a state in which the silicon oxide particles 4 are aligned and accumulated at the time of forming the coating film, and enables achieving the porous layer 3 which has low scattering and is excellent in film strength.

The fluorine-containing organic acid 7 contained in the coating liquid or the porous layer 3 can be determined by elementary analysis in silicon oxide particles or the porous layer, the separated quantitative analysis of the organic acid by ion-exclusion chromatography or the like, or the like.

Examples of a suitable fluorine-containing organic acid 7 for the present invention include 2,2,3,3-tetrafluoropropionic acid, pentafluoropropionic acid, heptafluorobutyric acid, nonafluorovaleric acid, undecafluorohexanoic acid, dodecafluorosuberic acid and tridecafluoroheptanoic acid.

The fluorine-containing organic acid 7 is preferably an organic acid wherein the number of fluorine atoms in one molecule (hereafter merely described as the fluorine number) is 5 or more and 11 or less. The porous layer 3 contains the organic acid wherein the number of fluorine atoms in one molecule is 5 or more and 11 or less. Low scattering and film strength can be achieved thereby.

When the fluorine number is less than 5, the reactions of the groups Si—OH is promoted insufficiently even though the dispersibility of the silicon oxide particles 4 in the coating liquid can be improved. Therefore, a coating film is difficult to form in a state in which the silicon oxide particles 4 when the coating film is formed are aligned and accumulated, and the scattering tends to deteriorate. When the fluorine number is more than 11, the coatability and the temporal stability of the coating liquid deteriorate, and the appearance quality of the obtained porous layer 3 may therefore decrease. When the fluorine number is more than 11, the repulsive force of CF groups is too large, the silicon oxide particles 4 when the coating film is formed are not arranged uniformly, and the scattering and the film strength tend to deteriorate.

Examples of the shape of a silicon oxide particle 4 include shapes such as a true sphere, a cocoon shape, a straw bag shape, a disk, a rod shape, a needle shape, a square shape and a chain shape. Especially, the silicon oxide particles 4 preferably include hollow silicon oxide particles which are hollow particles having pores inside and having shells around the outsides of the pores as illustrated in FIG. 2; or chain-like silicon oxide particles which are hydrophilic particle connected bodies as illustrated in FIG. 3 (hereafter merely described as silicon oxide particle connected bodies).

The hollow silicon oxide particle enables reducing the refractive index of the porous layer 3 with air (refractive index 1.0) contained in the pores. The pores may be either single pores or multi-pores, and either can be optionally selected. The hollow silicon oxide particle can be manufactured by a method described, for example, in Japanese Patent Application Laid-Open No. 2001-233611, Japanese Patent Application Laid-Open No. 2008-139581 or the like as a method for manufacturing a hollow silicon oxide particle. The hollow silicon oxide particles enable reducing the refractive index of a layer formed by piling a plurality of tiers of the silicon oxide particles 4 aligned in a direction parallel to the base material 2.

The inorganic binder 5 in the present invention is preferably a silicon oxide binder.

(Coating Liquid for Forming Porous Layer)

A coating liquid according to the present invention is a coating liquid for forming a porous layer 3 wherein the coating liquid contains a silicon oxide particle 4 having a fluorine-containing organic acid 7 on the surface, an inorganic binder 5 and an organic solvent.

The organic solvent which can be used for the coating liquid may be a solvent wherein the silicon oxide particle does not deposit, or the coating liquid does not thicken rapidly. Specific examples of the organic solvent include the following solvents. Monohydric alcohols such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2, 4-dimethyl-3-pentanol, 3-ethylbutanol, 1-heptanol, 2-heptanol, 1-octanol and 2-octanol. Di- or more hydric alcohols such as ethylene glycol and triethylene glycol. Ether alcohols such as methoxyethanol, ethoxyethanol, propoxyethanol, isopropoxyethanol, butoxyethanol, 1-methoxy-2-propanol, 1-ethoxy-2-propanol and 1-propoxy-2-propanol; and ether such as dimethoxyethane, diglyme (diethylene glycol dimethyl ether), tetrahydrofuran, dioxane, diisopropyl ether, dibutyl ether and cyclopentyl methyl ether. Esters such as ethyl formate, ethyl acetate, n-butyl acetate, methyl lactate, ethyl lactate, ethylene glycol monomethyl ether acetate, ethylene glycol monoethyl ether acetate, ethylene glycol monobutyl ether acetate and propylene glycol monomethyl ether acetate. Various aliphatic or alicyclic hydrocarbons such as n-hexane, n-octane, cyclohexane, cyclopentane and cyclooctane. Various aromatic hydrocarbons such as toluene, xylene and ethylbenzene. Various ketones such as acetone, methyl ethyl ketone, methyl isobutyl ketone, cyclopentanone and cyclohexanone. Various chlorinated hydrocarbons such as chloroform, methylene chloride, carbon tetrachloride and tetrachloroethane. Aprotic polar solvents such as N-methylpyrrolidone, N,N-dimethylformamide, N,N-dimethylacetamide and ethylene carbonate. Among these solvents, two or more solvents can also be mixed and used.

The solvent contained in the coating liquid is preferably a water-soluble solvent 30% or more of which has 4 or more and 6 or less carbon atoms and has a hydroxyl group from the viewpoints of the dispersibility and the coatability of the silicon oxide particle 4. Especially a solvent containing one or more selected from the group consisting of ethoxyethanol, propoxyethanol, isopropoxyethanol, butoxyethanol, 1-methoxy-2-propanol, 1-ethoxy-2-propanol, 1-propoxy-2-propanol and ethyl lactate is particularly preferable.

The fluorine-containing organic acid wherein the fluorine number in one molecule is 5 or more and 11 or less is added to the surface of the silicon oxide particle 4. The fluorine-containing organic acid is more specifically added to some of the OH groups existing on the surface of the silicon oxide particle 4. The distance between silicon oxide particles 4 is maintained by the fluorine-containing organic acid 7 added to their respective surfaces, the aggregation of the silicon oxide particles 4 contained in the coating liquid is suppressed, and the dispersibility improves. When a coating film is formed, a state in which the silicon oxide particles 4 are aligned and accumulated is maintained by the fluorine-containing organic acid, and the porous layer 3 which has low scattering and is excellent in film strength can therefore be obtained.

The fluorine-containing organic acid 7 is contained preferably in the range of 0.1 phr or more and 8 phr or less, more preferably in the range of 0.2 phr or more and 2.0 phr or less based on silicon oxide. Here, "phr" represents parts by weight of the fluorine-containing organic acid with respect to 100 parts by weight of silicon oxide. When the fluorine-containing organic acid 7 is contained in the range of less than 0.1 phr based on silicon oxide, the coating film cannot be fully formed in a state in which the silicon oxide particles 4 when the coating film is formed are aligned and accumulated, and the scattering deteriorates. The dispersion stability of the silicon oxide particle 4 in the coating liquid deteriorates due to the influence of the dispersion medium or the binder, and temporary thickening and gelling of the coating liquid may be caused. When the fluorine-containing organic acid 7 is contained in the range of more than 8 phr based on silicon oxide, the silicon oxide particles 4 is easily packed finely, the vacant spaces 6 decreases, and the refractive index of the coating film itself therefore increases easily.

The acid dissociation constant of the fluorine-containing organic acid 7 is preferably 0 pKa or more and 0.5 pKa or less, and more preferably 0.1 pKa or more and 0.3 pKa or less. When the acid dissociation constant is less than 0 pKa, the arrangement of silicon oxide particles 4 when the coating film is formed is out of order, and the scattering deteriorates easily. When the acid dissociation constant is more than 0.5 pKa, the strength of the coating film decreases. Therefore, when the coating film is wiped, linear flaws are made easily, and the appearance quality of the obtained porous layer 3 may deteriorate slightly.

The molecular weight of the fluorine-containing organic acid 7 is preferably 100 or more and 360 or less. When the molecular weight is less than 100, the scattering deteriorates easily. When the molecular weight is more than 360, the temporal stability of the coating liquid may deteriorate.

When the silicon oxide particle 4 is a hollow silicon oxide particle, the average particle diameter is 15 nm or more and 100 nm or less, preferably desirably 15 nm or more and 60 nm or less. When the average particle diameter of the hollow silicon oxide particle is less than 15 nm, a particle to be a core required to make a hollow silicon oxide particle is difficult to manufacture stably. Therefore, it becomes difficult to make a hollow silicon oxide particle itself. When the average particle diameter of the hollow silicon oxide particle is more than 100 nm, the sizes of the vacant spaces 6 of the hollow silicon oxide particle are large. Therefore, large voids are easily produced, the scattering accompanying the size of the hollow silicon oxide particle occurs, and such an average particle diameter is therefore unpreferable.

Here, the average particle diameter of the hollow silicon oxide particle is an average Feret's diameter. This average Feret's diameter can be measured by subjecting an image in which a plurality of the hollow silicon oxide particles contained in the coating liquid is observed with a transmission electron microscope image to image processing. As the image processing method, image processing such as image Pro PLUS (manufactured by Media Cybernetics, Inc.) can be used. In a predetermined image region, the contrast is adjusted optionally if required, the average Feret's diameter of each particle can be measured by measuring the particle, and the average value can be calculated and found.

The thickness of the shell of the hollow silicon oxide particle is 10% or more and 50% or less, and preferably desirably 20% or more and 35% or less of the average particle diameter. When the thickness of the shell is less than 10%, the strength of the particle is short, and such a thickness is therefore unpreferable. When the thickness of the shell is more than 50%, the effect of the hollows is not exhibited in the refractive index remarkably, and such a thickness is therefore unpreferable.

Next, the case where the silicon oxide particles 4 are chain-like silicon oxide particles will be described. The chain-like silicon oxide particles are secondary particles in which a plurality of solid silicon oxide particles which are primary particles lies in straight or curved lines. The size of a chain-like silicon oxide particle can be expressed in the minor axis and the major axis.

The minor axis of a chain-like silicon oxide particle corresponds to the thickness of the chain-like silicon oxide particle, namely the average particle diameter of one primary particle constituting the chain-like silicon oxide particle, and can be calculated from the specific surface area determined by nitrogen adsorption as to the chain-like silicon oxide particle extracted from the coating liquid. The average of the minor axes of the chain-like silicon oxide particles is preferably 8 nm or more and 20 nm or less. When the minor axis is less than 8 nm, the surface area of the silicon oxide particle 4 increases excessively, the possibility that the reliability decreases by incorporating water or chemical substances in the atmosphere increases. When the average of the minor axes is more than 20 nm, the chain-like silicon oxide particle is unstably dispersed in the solvent, and the coatability may deteriorate.

Meanwhile, the major axis of the chain-like silicon oxide particle corresponds to the length of the secondary particles, namely the average particle diameter of a connected body, and can be determined by dynamic light scattering. The major axis of the chain-like silicon oxide particle is preferably 4 times or more and 8 times or less the minor axis. When the major axis is less than 4 times the minor axis, the refractive index may not decrease fully at the time of forming a film. When the major axis is more than 8 times the minor axis, the coatability or the leveling property deteriorate due to thickening, and a film is difficult to form.

The shapes of the primary particles constituting the chain-like silicon oxide particles may be in a state in which the shapes of the primary particles can be clearly observed or a state in which the particles fuse mutually and lose their shapes. However, the shapes are preferably in a state in which the shapes of the primary particles can be clearly observed. An individual primary particle constituting a chain-like silicon oxide particle may be a true sphere shape, a cocoon shape or a straw bag shape. The individual primary particle is preferably a particle wherein the individual primary particle has a cocoon shape or a straw bag shape, and more preferably a particle wherein the minor axis is 8 nm or more and 20 nm or less, and the major axis is 1.5 times or more and 3.0 times or less the minor axis. As long as the relationship between the minor axis and the major axis is in the above-mentioned range, particles in the shapes of true spheres, cocoons, straw bags, disks, rods, needles, squares, and the like may be mixed in the coating liquid in addition to the chain-like silicon oxide particle.

The chain-like silicon oxide particles preferably have a surface state in which the chain-like silicon oxide particles can be bound to each other. Although the chain-like silicon oxide particles originally have many silanol groups (Si—OH) on the surfaces, further increasing the number of silanol groups on the surfaces by a method for mixing with silica sol enables the surfaces to be in a state in which the chain-like silicon oxide particles can be bound to each other. When a coating composition is applied and dried, and a plurality of chain-like silicon oxide particles 4 are in contact with each other, a film having high scratch resistance can be achieved in the case where the chain-like silicon oxide particles are bound to each other.

The Inorganic binder 5 which binds the particles in the present invention is preferably a silicon oxide oligomer obtained by hydrolyzing and condensing a silicate ester.

In the present invention, the content of the inorganic binder 5 is preferably 1.0 phr or more and 20 phr or less, and more preferably 3.0 phr or more and 15 phr or less based on the content of the silicon oxide particle 4. When the content of inorganic binder 5 is less than 1.0 phr based on the content of the silicon oxide particle 4, enough film strength is not obtained. When the content of inorganic binder 5 is more than 20 phr based on the content of the silicon oxide particle 4, the scattering in visible light may deteriorate, or the refractive index may increase.

(Optical Member and Method for Manufacturing Same)

A method for manufacturing an optical member 1 of the present invention has applying a coating liquid for forming a porous layer 3 to form a coating film on a base material 2 and drying and/or firing the base material 1 on which the coating film is formed to form a porous layer.

Examples of the method for applying a coating liquid include spin coating, blade coating, roll coating, slit coating, printing and dip coating. When an optical member having a three-dimensionally complicated shape such as a recessed surface is manufactured, spin coating is preferable from the viewpoint of the evenness of the film thickness.

To form the porous layer 3 of the present invention, the coating liquid is applied to the base material, and drying and/or hardening is performed. Drying and/or hardening is a step for removing a solvent, accumulating silicon oxide particles with the arrangeability in order while the silicon oxide particles are bound and forming the porous layer 3. Although the temperature of drying and/or hardening depends on the heat-resistant temperature of the base material 2, the temperature is preferably 20° C. or more and 200° C. or less. Although the time of drying and/or hardening may be such time that the organic solvent in the layer can be evaporated without affecting the base material, the time is preferably 10 minutes or more and 200 hours or less, and further preferably 30 minutes or more and 24 hours or less.

The optical member 1 of the present invention obtained by the above-mentioned method has at least the base material 2 and the porous layer 3 on the base material 2.

Glass, resin or the like can be used for the base material 2. Its shape is not limited, and may be a flat surface, a curved surface, a recessed surface, a projecting surface or a film.

As the glass, inorganic glass containing zirconium oxide, titanium oxide, tantalum oxide, niobium oxide, hafnium oxide, lanthanum oxide, gadolinium oxide, silicon oxide, calcium oxide, barium oxide, sodium oxide, potassium oxide, boron oxide, aluminum oxide or the like can be used. As a glass base material, a glass base material formed by grinding polishing, molding, float forming or the like can be used.

As the resin, polyethylene terephthalate, polyethylene naphthalate, triacetyl cellulose, an acrylic resin, polycarbonate, a cycloolefin polymer, polyvinyl alcohol or the like can be used.

The refractive index of the porous layer 3 of the present invention is preferably 1.20 or more and 1.30 or less, and more preferably 1.20 or more and 1.24 or less. When the refractive index is less than 1.20, the ratio of vacant spaces contained in the film is high, the abrasion resistance of the porous layer may therefore be short. When the refractive index is more than 1.30, the refractive index difference between air and the base material 2 cannot be fully reduced, and the antireflection effect may not be fully obtained.

Additionally, the amount of Na contained in the porous layer 3 of the present invention is suppressed to 10 ppm or less. It is because the Na content of the coating liquid used for the porous layer 3 of the present invention is suppressed to 1 ppm or less.

Moreover, the surface of the porous layer 3 of the present invention is preferably hydrophilic. The contact angle of pure water at a room temperature of 23° C. and a humidity of 40 to 45% RH is specifically preferably 3° or more and 20° or less, and further preferably 5° or more and 10° or less. When the contact angle of pure water is less than 3°, water or the like easily enters the film from the surface of the porous layer 3, and the environmental stability may be deteriorated. When the contact angle of pure water is more than 20°, the silicon oxide particles may be weakly bound, and the abrasion resistance of the porous layer 3 may not be enough.

Additionally, an antifouling layer or the like may be provided on the surface of the porous layer 3 of the present invention if needed. Examples of the antifouling layer include a fluoropolymer layer, a fluorosilane monomolecular layer and a titanium oxide particle layer.

An intermediate layer may be provided between the base material 2 and the porous layer 3 in the optical member 1 according to the present invention. The intermediate layer has the function of preventing the diffusion of impurities from the glass base material or increasing the antireflection performance of the porous layer 3. Preferable examples of the intermediate layer include high refractive index layers containing zirconium oxide, titanium oxide, tantalum oxide, niobium oxide and hafnium oxide; low refractive index layers containing silicon oxide and magnesium fluoride; aluminum oxide; and polymers. Although the intermediate layer may be a monolayer or be formed by layering a plurality of layers, an intermediate layer formed by layering a plurality of high refractive index layers and low refractive index layers alternately is preferable.

The optical member 1 of the present invention can be used as an optical lens, an optical mirror, a filter or an optical film. Especially the optical member 1 is particularly preferably used as an optical lens. The optical member 1 according to the present invention is not limited to members constituting a semiconductor device and a liquid crystal panel for which the high purity is required, and can be used for various optical devices. The optical member 1 is preferable especially as a lens of an image capturing optical system which an image capturing apparatus for which high antireflection performance is required includes.

If the optical member 1 of the present invention is used for an image capturing optical system, the reflection of light on the surface of the optical member 1 is suppressed, the transmissivity of light improves, and the flare and the ghost also decrease greatly while light from outside forms an image on an image capturing element through the image capturing optical system. Therefore, a high-quality image can be acquired.

(Optical Device)

Optical members of the present invention can be used as various optical lenses, micro lenses and glass for liquid crystal panels, and optical devices provided with the optical members of the present invention can be applied to image capturing devices, liquid crystal projectors, an image capturing sensors, liquid crystal panels and the like.

Figure 4:
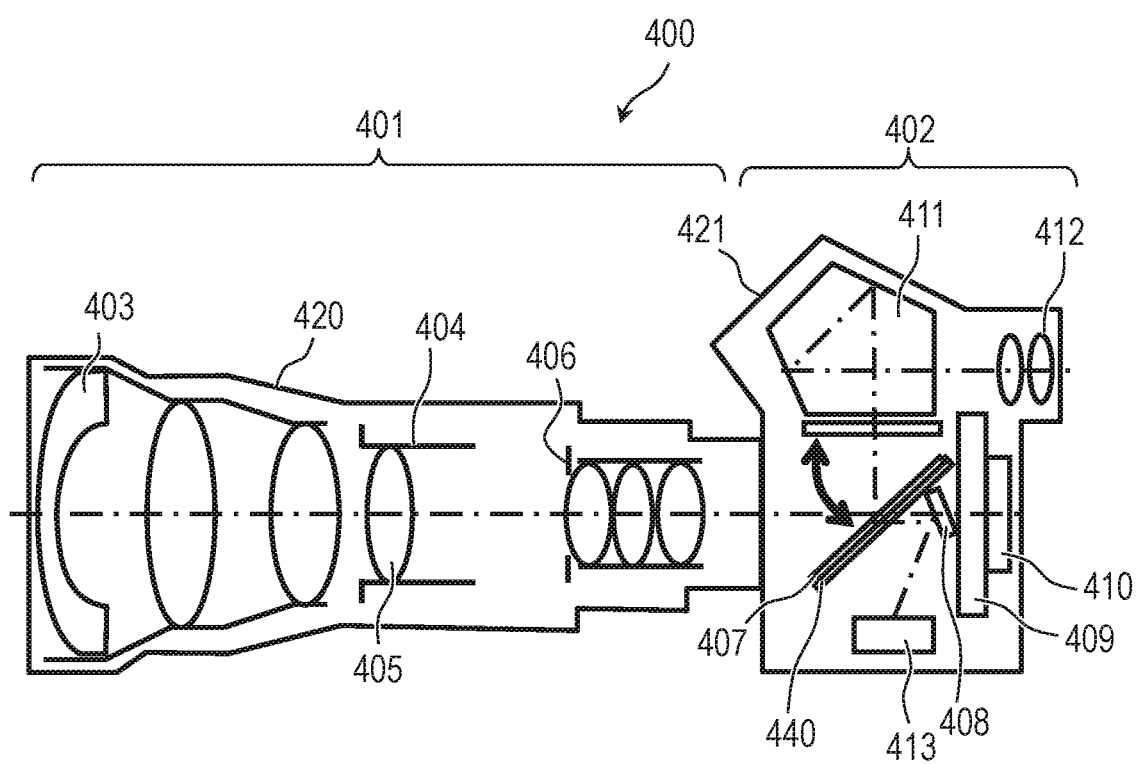
FIG. 4 is a schematic diagram illustrating one embodiment of an image capturing apparatus as one example of an optical device of the present invention.

FIG. 4 is an example of a preferable embodiment of an image capturing apparatus of the present invention, and illustrates an example of the configuration of a single-lens reflex digital camera to which a lens barrel (interchangeable lens) which is an example of an optical device of the present invention is connected.

The optical device of the present invention is an optical device including a case and an optical system having a plurality of lenses in the case, and means a device such as binoculars, a microscope, a semiconductor aligner and an interchangeable lens including an optical system including optical members of the present invention. Alternatively, the optical device means a device for forming an image with light passing the optical member of the present invention, a so-called interchangeable lens of a camera.

The image capturing apparatus of the present invention means an electronic device such as a camera system such as a digital still camera or a digital video camera; or a cellular phone including an image capturing element which receives light which passes the optical member of the present invention. A module-shaped form with which an electronic device is equipped, for example a camera module, may be considered as the image capturing apparatus.

In FIG. 4, an image capturing apparatus 400 is formed by connecting a camera body 402 and a lens barrel 401, which is an optical device. The lens barrel 401 is a so-called interchangeable lens detachably attachable to the camera body 402.

Light from a subject passes an optical system including a plurality of lenses 403, 405 and the like disposed on the optical axis of a photographic optical system in the case 420 of the lens barrel 401, and is received by an image capturing element. The optical member of the present invention is disposed as a lens such as the lens 403 constituting the optical system.

Here, the lens 405 is supported by an inner barrel 404 and movably supported on the outer barrel of the lens barrel 401 for focusing or zooming.

In an observation period before photographing, light from the subject is reflected by a main mirror 407 in the case 421 of the camera and passes a prism 411, and a photographic image is then shown to a photographer through a finder lens 412. The main mirror 407 functions as a half mirror, light which penetrates the main mirror is reflected in the direction of an AF (autofocus) unit 413 by a submirror 408, and for example, this reflected light is used for measuring the distance. The main mirror 407 is installed and supported in a main mirror holder 440 by adhesion or the like. The main mirror 407 and submirror 408 are moved out of the optical path through an unillustrated driving mechanism at the time of photographing, a shutter 409 is opened, and a photographed optical image which is input to an image capturing element 410 from the lens barrel 401 is formed. A diaphragm 406 is configured so that the brightness and the depth of focus at the time of photographing can be changed by changing the aperture area.

Thus, in the optical device and the image capturing apparatus according to the present invention, the reflection of light which passes the optical system is reduced. When an image is captured using these, a sharp image in which the flare and the ghost are reduced can therefore be obtained.

EXAMPLES

The present invention will be described by the Examples specifically hereinafter. The present invention can be optionally changed as long as the present invention does not exceed its gist, and the Examples described hereinafter does not limit the invention to these.

<Evaluation of Coatability when Porous Layer is Formed>

The coatability of a coating liquid for forming a porous layer was evaluated as follows. When a coating liquid was dropped on the polished surface side of a glass substrate (synthetic quartz wherein the synthetic quartz has a diameter of 30 mm and a thickness of 1 mm, and one surface was polished) so that a porous layer has a thickness of around 120 nm, and a film were formed in a spin coater, the appearance evaluation was performed for checking whether defects occurred on the porous layer.

A porous layer wherein no apparent defects were observed at all (A) was considered to have very good coatability. A porous layer wherein no apparent defects were observed, but dropping marks were produced slightly (B) was considered to have good coatability. A porous layer wherein the production of dropping marks and foreign substances were observed slightly (C) was considered to have normal coatability. A porous layer wherein striped defects and the like occurred due to unevenness and foreign substances, and the porous layer seems inferior clearly (D) was considered to have inferior coatability.

A: The coatability is very good.
B: The coatability is good.
C: The coatability is normal.
D: The coatability is inferior.

In the present invention, when the evaluation of the coatability was A, B or C, the coating liquid was defined as a coating liquid having no problem with coatability.

<Evaluation of Scattering of Porous Layer>

The evaluation of the scattering of a porous layer was performed as follows. First, a base material holder was installed so that a glass substrate (synthetic quartz wherein the glass substrate has a diameter of 30 mm and a thickness of 1 mm, and both surfaces were polished) on which a porous layer was formed was always located at the same position. Then, an illuminometer (T-10M manufactured by Konica Minolta Sensing, Inc.) was installed on the base material holder. While the illumination was measured, white light was irradiated so that the illumination from a direction perpendicular to a base material surface side was adjusted to 4000 lux. Next, the glass substrate on which the porous layer was formed was installed so that the white light-irradiating side is the film formation surface of the porous layer. The installed glass substrate was tilted to 45°, and photographing was performed from the direction of the normal line to the opposite surface to the irradiated side using a camera (lens: EF 50 mm f/2.5 Compact Macro manufactured by Canon Inc., camera: EOS-70D manufactured by Canon Inc.). Photographing was performed under the photographic conditions of the camera wherein the ISO was 400, the white balance was fine, the lens opening was 10, and the shutter speed was 10 seconds. The scattering was evaluated with the average luminance value calculated as to any 4 areas of 700 pix×700 pix on the surface of the glass base material in the photographed image defined as a scattering value.

In the present invention, a coating film wherein the value of scattering calculated by the above-mentioned method was 25 or less was defined as a porous layer wherein low scattering was achieved.

<Evaluation of Film Strength of Porous Layer>

The film strength of a porous layer was evaluated as follows. First, a porous layer is formed on the polished surface side of a glass substrate (synthetic quartz wherein the synthetic quartz has a diameter of 30 mm and a thickness of 1 mm, and one surface was polished). A load of 1000 g/cm$^2$ was applied to a polyester wiper (AlphaWipe TX1009, manufactured by Texwipe Company) which was soaked with ethanol, the wiper was made to making 10 round-trips on the porous layer, and the appearance evaluation was then performed for checking whether defects occurred on the porous layer.

A porous layer wherein almost no apparent changes were observed (A) was considered to be a film having very good film strength. A porous layer wherein the appearance and the like were changed slightly (B) was considered to be a film having good film strength. A porous layer wherein the appearance and the like were changed, and a very few line flaws and the like were produced (C) was considered to be a film having normal film strength. A porous layer wherein the appearance and the like were changed markedly, and line flaws, film exfoliation and the like were produced (D) was considered to be a film having inferior film strength.

A: A film having very good film strength
B: A film having good film strength
C: A film having normal film strength
D: A film having inferior film strength In the present invention, when the evaluation of the film strength was A, B or C, the porous layer was defined as a film having no problem with film strength.

<Evaluation of Refractive Index of Porous Layer>

The refractive index was evaluated as follows. First, a porous layer was formed on the polished surface side of a glass substrate (synthetic quartz wherein the synthetic quartz has a diameter of 30 mm and a thickness of 1 mm, and one surface was polished) and measured at wavelengths of 380 nm to 800 nm using a spectroscopic ellipsometer (VASE, manufactured by J.A. Woollam Co., Inc.). The refractive index was defined as a refractive index at a wavelength of 550 nm. The refractive index was evaluated by the following standard.

A: A porous layer having a refractive index of 1.24 or less
B: A porous layer having a refractive index of more than 1.24 and 1.30 or less
C: A porous layer having a refractive index of more than 1.30

In the present invention, when the evaluation of the refractive index was A or B, the porous layer was defined as a film having no problem as a porous layer having low refractive index.

Coating liquids for forming porous layers in Example 1 to Example 9 were produced, and porous layers were formed by the following methods.

<Production of Coating Liquid and Formation of Porous Layer>

Example 1

While 1-ethoxy-2-propanol (hereafter abbreviated as 1E2P) was added to 580 g of a dispersion of a hollow silicon oxide particle in isopropyl alcohol (manufactured by JGC Catalysts and Chemicals Ltd., THRULYA 1110, average particle diameter: around 50 nm, shell thickness: around 10 nm, solid concentration: 20.5% by mass), isopropyl alcohol was heated and distilled off. Isopropyl alcohol was distilled off until the solid concentration was 19.5% by mass, and 610 g of a liquid of the hollow silicon oxide particle wherein the solvent was replaced with 1E2P (hereafter called a solvent replacement liquid 1) was prepared. A fluorine-containing organic acid (manufactured by Tokyo Chemical Industry Co., Ltd., pentafluoropropionic acid, fluorine number: 5) was added to the obtained solvent replacement liquid 1 so that the component ratio of the hollow silicon oxide particle to the fluorine-containing organic acid was 100/1, and a dispersion 1 was obtained.

To a different container were added slowly 11.4 g of 1-propoxy-2-propanol and 4.5 g of methyl polysilicate (manufactured by COLCOAT CO., LTD., methyl silicate 53A), and the mixture was stirred at room temperature for 120 minutes to prepare a silica sol (hereinafter called a silica sol 1).

The dispersion 1 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 1 containing the hollow silicon oxide particle.

The obtained coating liquid 1 was dropped on a glass substrate, a film was formed with a spin coater so that the thickness was around 120 nm, firing was then performed in a thermostatic oven at 140° C. for 30 minutes to obtain an optical member 1 having a porous layer 1. The contact angle of pure water in the porous layer 1 is 10°.

Example 2

A fluorine-containing organic acid (manufactured by Tokyo Chemical Industry Co., Ltd., heptafluorobutyric acid, fluorine number: 7) was added to the solvent replacement liquid 1 so that the component ratio of the hollow silicon oxide particle to the fluorine-containing organic acid was 100/1, and a dispersion 2 was obtained.

The dispersion 2 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 2 containing the hollow silicon oxide particle.

The obtained coating liquid 2 was dropped on a glass substrate, a film was formed with a spin coater so that the thickness was around 120 nm, firing was then performed in a thermostatic oven at 140° C. for 30 minutes to obtain an optical member 2 having a porous layer 2. The contact angle of pure water in the porous layer 2 is 9°.

Example 3

A fluorine-containing organic acid (manufactured by Tokyo Chemical Industry Co., Ltd., nonafluorovaleric acid, fluorine number: 9) was added to the solvent replacement liquid 1 so that the component ratio of the hollow silicon oxide particle to the fluorine-containing organic acid was 100/1, and a dispersion 3 was obtained.

The dispersion 3 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 3 containing the hollow silicon oxide particle.

The obtained coating liquid 3 was dropped on a glass substrate, a film was formed with a spin coater so that the thickness was around 120 nm, firing was then performed in a thermostatic oven at 140° C. for 30 minutes to obtain an optical member 3 having a porous layer 3. The contact angle of pure water in the porous layer 3 is 11°.

Example 4

A fluorine-containing organic acid (manufactured by Tokyo Chemical Industry Co., Ltd., undecafluorohexanoic acid, fluorine number: 11) was added to the solvent replacement liquid 1 so that the component ratio of the hollow silicon oxide particle to the fluorine-containing organic acid was 100/2, and a dispersion 4 was obtained.

The dispersion 4 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 4 containing the hollow silicon oxide particle.

The obtained coating liquid 4 was dropped on a glass substrate, a film was formed with a spin coater so that the thickness was around 120 nm, firing was then performed in a thermostatic oven at 140° C. for 30 minutes to obtain an optical member 4 having a porous layer 4. The contact angle of pure water in the porous layer 4 is 10°.

Example 5

While 1-methoxy-2-propanol (hereafter abbreviated as PGME) was added to 500 g of an aqueous dispersion of a hydrophilic silicon oxide particle (manufactured by FUSO CHEMICAL CO., LTD., PL-1, average particle diameter: around 15 nm, major axis/minor axis=2.6, solid concentration: 12% by mass), water was heated and distilled off. Water was distilled off until the solid concentration was 17% by mass, and 350 g of a liquid of the hydrophilic silicon oxide particle wherein the solvent was replaced with PGME (hereafter called a solvent replacement liquid 2) was prepared. A fluorine-containing organic acid (manufactured by Tokyo Chemical Industry Co., Ltd., undecafluorohexanoic acid, fluorine number: 11) was added to the obtained solvent replacement liquid 2 so that the component ratio of the hydrophilic silicon oxide particle to the fluorine-containing organic acid was 100/3, and a dispersion 5 was obtained.

To a different container were added slowly 18.0 g of pure water and 20.0 g of ethyl silicate, and the mixture was stirred at room temperature for 120 minutes to prepare a silica sol (hereinafter called a silica sol 2).

The dispersion 5 was diluted with 1-propoxy-2-propanol so that the solid concentration was 4.5% by mass, and the silica sol 2 was then added so that the component ratio of the hydrophilic silicon oxide particle to the silica sol was 100/12. The mixture was further mixed and stirred at room temperature for 2 hours to obtain a coating liquid 5 containing a hydrophilic silicon oxide particle connected body.

The obtained coating liquid 5 was dropped on a glass substrate, a film was formed with a spin coater so that the thickness was around 120 nm, firing was then performed in a thermostatic oven at 140° C. for 30 minutes to obtain an optical member 5 having a porous layer 5. The contact angle of pure water in the porous layer 5 is 10°.

Example 6

A fluorine-containing organic acid (manufactured by Tokyo Chemical Industry Co., Ltd., undecafluorohexanoic acid, fluorine number: 11) was added to the solvent replacement liquid 2 so that the component ratio of the hydrophilic silicon oxide particle to the fluorine-containing organic acid was 100/8, and a dispersion 6 was obtained.

The dispersion 6 was diluted with 1-propoxy-2-propanol so that the solid concentration was 4.5% by mass, and the silica sol 2 was then added so that the component ratio of the hydrophilic silicon oxide particle to the silica sol was 100/12. The mixture was further mixed and stirred at room temperature for 2 hours to obtain a coating liquid 6 containing a connected body of the hydrophilic silicon oxide particle.

The obtained coating liquid 6 was dropped on a glass substrate, a film was formed with a spin coater so that the thickness was around 120 nm, firing was then performed in a thermostatic oven at 140° C. for 30 minutes to obtain an optical member 6 having a porous layer 6. The contact angle of pure water in the porous layer 6 is 11°.

Example 7

A fluorine-containing organic acid (manufactured by Tokyo Chemical Industry Co., Ltd., heptafluorobutyric acid, fluorine number: 7) was added to the solvent replacement liquid 1 so that the component ratio of the hollow silicon oxide particle to the fluorine-containing organic acid was 100/0.2, and a dispersion 7 was obtained.

The dispersion 7 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 7 containing the hollow silicon oxide particle.

The obtained coating liquid 7 was dropped on a glass substrate, a film was formed with a spin coater so that the thickness was around 120 nm, firing was then performed in a thermostatic oven at 140° C. for 30 minutes to obtain an optical member 7 having a porous layer 7. The contact angle of pure water in the porous layer 7 is 8°.

Example 8

A fluorine-containing organic acid (manufactured by Tokyo Chemical Industry Co., Ltd., heptafluorobutyric acid, fluorine number: 7) was added to the solvent replacement liquid 1 so that the component ratio of the hollow silicon oxide particle to the fluorine-containing organic acid was 100/0.1, and a dispersion 8 was obtained.

The dispersion 8 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 8 containing the hollow silicon oxide particle.

The obtained coating liquid 8 was dropped on a glass substrate, a film was formed with a spin coater so that the thickness was around 120 nm, firing was then performed in a thermostatic oven at 140° C. for 30 minutes to obtain an optical member 8 having a porous layer 8. The contact angle of pure water in the porous layer 8 is 9°.

Example 9

A fluorine-containing organic acid (manufactured by Tokyo Chemical Industry Co., Ltd., heptafluorobutyric acid, fluorine number: 7) was added to the solvent replacement liquid 1 so that the component ratio of the hollow silicon oxide particle to the fluorine-containing organic acid was 100/0.05, and a dispersion 9 was obtained.

The dispersion 9 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 9 containing the hollow silicon oxide particle.

The obtained coating liquid 9 was dropped on a glass substrate, a film was formed with a spin coater so that the thickness was around 120 nm, firing was then performed in a thermostatic oven at 140° C. for 30 minutes to obtain an optical member 9 having a porous layer 9. The contact angle of pure water in the porous layer 9 is 10°.

Comparative Example 1

An inorganic acid (manufactured by Tokyo Chemical Industry Co., Ltd., hydrochloric acid, fluorine number: 0) was added to the solvent replacement liquid 1 so that the component ratio of the hollow silicon oxide particle to the inorganic acid was 100/1, and a dispersion 10 was obtained.

The dispersion 10 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 10 containing the hollow silicon oxide particle.

The obtained coating liquid 10 was dropped on a glass substrate, a film was formed with a spin coater so that the thickness was around 120 nm, firing was then performed in a thermostatic oven at 140° C. for 30 minutes to obtain an optical member 10 having a porous layer 10. The contact angle of pure water in the porous layer 10 is 28°.

Comparative Example 2

The solvent replacement liquid 1 was diluted with ethyl lactate so that the solid concentration was 4.5% by mass, a dispersion 11 was obtained, and the silica sol 1 was then added so that the component ratio of the hollow silicon oxide particle to the silica sol was 100/12. The mixture was further mixed and stirred at room temperature for 2 hours to obtain a coating liquid 11 containing the hollow silicon oxide particle.

The obtained coating liquid 11 was dropped on a glass substrate, a film was formed with a spin coater so that the thickness was around 120 nm, firing was then performed in a thermostatic oven at 140° C. for 30 minutes to obtain an optical member 11 having a porous layer 11. The contact angle of pure water in the porous layer 11 is 9°.

Comparative Example 3

A fluorine-containing organic acid (manufactured by Tokyo Chemical Industry Co., Ltd., difluoroacetic acid, fluorine number: 2) was added to the solvent replacement liquid 2 so that the component ratio of the hydrophilic silicon oxide particle to the fluorine-containing organic acid was 100/0.05, and a dispersion 12 was obtained.

The dispersion 12 was diluted with 1-propoxy-2-propanol so that the solid concentration was 4.5% by mass, and the silica sol 2 was then added so that the component ratio of the hydrophilic silicon oxide particle to the silica sol was 100/12. The mixture was further mixed and stirred at room temperature for 2 hours to obtain a coating liquid 12 containing a connected body of the hydrophilic silicon oxide particle.

The obtained coating liquid 12 was dropped on a glass substrate, a film was formed with a spin coater so that the thickness was around 120 nm, firing was then performed in a thermostatic oven at 140° C. for 30 minutes to obtain an optical member 12 having a porous layer 12. The contact angle of pure water in the porous layer 12 is 17°.

Comparative Example 4

A fluorine-containing organic acid (manufactured by Tokyo Chemical Industry Co., Ltd., 2,2,3,3-tetrafluoropropionic acid, fluorine number: 4) was added to the solvent replacement liquid 1 so that the component ratio of the hollow silicon oxide particle to the fluorine-containing organic acid was 100/0.1, and a dispersion 13 was obtained.

The dispersion 13 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 13 containing the hollow silicon oxide particle.

The obtained coating liquid 13 was dropped on a glass substrate, a film was formed with a spin coater so that the thickness was around 120 nm, firing was then performed in a thermostatic oven at 140° C. for 30 minutes to obtain an optical member 13 having a porous layer 13. The contact angle of pure water in the porous layer 13 is 14°.

Comparative Example 5

A fluorine-containing organic acid (manufactured by Tokyo Chemical Industry Co., Ltd., dodecafluorosuberic acid, fluorine number: 12) was added to the solvent replacement liquid 1 so that the component ratio of the hollow silicon oxide particle to the fluorine-containing organic acid was 100/1, and a dispersion 14 was obtained.

The dispersion 14 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 14 containing the hollow silicon oxide particle.

The obtained coating liquid 14 was dropped on a glass substrate, a film was formed with a spin coater so that the thickness was around 120 nm, firing was then performed in a thermostatic oven at 140° C. for 30 minutes to obtain an optical member 14 having a porous layer 14. The contact angle of pure water in the porous layer 14 is 10°.

Comparative Example 6

A fluorine-containing organic acid (manufactured by Tokyo Chemical Industry Co., Ltd., tridecafluoroheptanoic acid, fluorine number: 13) was added to the solvent replacement liquid 1 so that the component ratio of the hollow silicon oxide particle to the fluorine-containing organic acid was 100/9, and a dispersion 15 was obtained.

The dispersion 15 was diluted with ethyl lactate so that the solid concentration was 4.5% by mass, and the silica sol 1 was then added so that the component ratio of the hollow silicon oxide particle to the silica sol was 100/12. The mixture was further mixed and stirred at room temperature for 2 hours to obtain a coating liquid 15 containing the hollow silicon oxide particle.

The obtained coating liquid 15 was dropped on a glass substrate, a film was formed with a spin coater so that the thickness was around 120 nm, firing was then performed in a thermostatic oven at 140° C. for 30 minutes to obtain an optical member 15 having a porous layer 15. The contact angle of pure water in the porous layer 15 is 13°.

Table 1 illustrates the evaluation results of the coating liquids 1 to 15 produced in the Examples and the Comparative Examples.

TABLE 1

| | | Coating liquid | | | | | | | Evaluation result |
|---|---|---|---|---|---|---|---|---|---|
| | | Fluorine-containing organic acid | | | | | Silicon oxide particle Shape | Inorganic binder Type | |
| | | Type | Fluorine number | pKa | Molecular weight | Content | | | Coatability |
| Example 1 | Coating liquid 1 | Pentafluoropropionic acid | 5 | 0.38 | 164.0 | 1.0 phr | Hollow particle | MS53A | B |
| Example 2 | Coating liquid 2 | Heptafluorobutyric acid | 7 | 0.17 | 214.0 | 1.0 phr | Hollow particle | MS53A | A |
| Example 3 | Coating liquid 3 | Nonafluorovaleric acid | 9 | 0.40 | 264.1 | 1.0 phr | Hollow particle | MS53A | C |
| Example 4 | Coating liquid 4 | Undecafluorohexanoic acid | 11 | 0.42 | 314.1 | 2.0 phr | Hollow particle | MS53A | C |
| Example 5 | Coating liquid 5 | Undecafluorohexanoic acid | 11 | 0.42 | 314.1 | 3.0 phr | Particle connected body | TEOS | C |
| Example 6 | Coating liquid 6 | Undecafluorohexanoic acid | 11 | 0.42 | 314.1 | 8.0 phr | Particle connected body | TEOS | C |
| Example 7 | Coating liquid 7 | Heptafluorobutyric acid | 7 | 0.17 | 214.0 | 0.2 phr | Hollow particle | MS53A | A |
| Example 8 | Coating liquid 8 | Heptafluorobutyric acid | 7 | 0.17 | 214.0 | 0.1 phr | Hollow particle | MS53A | A |
| Example 9 | Coating liquid 9 | Heptafluorobutyric acid | 7 | 0.17 | 214.0 | 0.05 phr | Hollow particle | MS53A | A |
| Comparative Example 1 | Coating liquid 10 | Hydrochloric acid | 0 | −8.00 | 36.5 | 1.0 phr | Hollow particle | MS53A | D |
| Comparative Example 2 | Coating liquid 11 | Nothing was added | — | — | — | — | Hollow particle | MS53A | C |
| Comparative Example 3 | Coating liquid 12 | Difluoroacetic acid | 2 | 1.20 | 96.0 | 0.05 phr | Particle connected body | MS53A | D |
| Comparative Example 4 | Coating liquid 13 | 2,2,3,3-Tetrafluoropropionic acid | 4 | 0.56 | 146.0 | 1.0 phr | Hollow particle | MS53A | D |
| Comparative Example 5 | Coating liquid 14 | Dodecafluorosuberic acid | 12 | 0.20 | 390.1 | 1.0 phr | Hollow particle | TEOS | A |
| Comparative Example 6 | Coating liquid 15 | Tridecafluoroheptanoic acid | 13 | 0.47 | 364.1 | 9.0 phr | Hollow particle | TEOS | C |

The following were found from the results of Table 1.

It was found that when the coating liquid 11 of Comparative Example 2 was applied, ring-shaped defects and dropping marks were conspicuous, many striped defects occurred radially, and the coating liquid 11 therefore had a problem with coatability. It is presumed that even though an inorganic acid enables dispersing silicon oxide particles in the coating liquid, the dispersing state of the silicon oxide particles is difficult to maintain at the time of forming a film, and much particle aggregation occurs in a film forming step. It was found that also in the coating liquids 12 and 13 of Comparative Examples 3 and 4, many striped defects wherein it was supposed that the contamination of deposits or foreign substances cause the striped defects occur, and linear flaws are easily produced, starting from the defects, at the time of wiping the coating films.

Next, Table 2 illustrates the results obtained by evaluating the respective porous layers of the optical members 1 to 15 manufactured in the Examples and the Comparative Examples as antireflection films.

TABLE 2

|  |  | Evaluation result of antireflection film | | |
| --- | --- | --- | --- | --- |
|  |  | Scattering | Film strength | Refractive index @550 nm |
| Example 1 | Optical member 1 | 19 | A | A |
| Example 2 | Optical member 2 | 20 | B | A |
| Example 3 | Optical member 3 | 20 | B | A |
| Example 4 | Optical member 4 | 20 | A | A |
| Example 5 | Optical member 5 | 21 | B | B |
| Example 6 | Optical member 6 | 22 | B | B |
| Example 7 | Optical member 7 | 18 | A | B |
| Example 8 | Optical member 8 | 19 | A | A |
| Example 9 | Optical member 9 | 23 | A | A |
| Comparative Example 1 | Optical member 10 | 29 | A | B |
| Comparative Example 2 | Optical member 11 | 29 | B | A |
| Comparative Example 3 | Optical member 12 | 29 | D | B |
| Comparative Example 4 | Optical member 13 | 27 | D | A |
| Comparative Example 5 | Optical member 14 | 26 | B | B |
| Comparative Example 6 | Optical member 15 | 28 | C | C |

It was found from the results of Table 2 that the optical members 1 to 9 were provided with films wherein the scattering was as low scattering as 25 or less, and the film strength was excellent. It was also found that the films enabled achieving enough performance as antireflection films having low refractive indices.

It was confirmed that it is difficult for the porous layers of the optical members 10 to 15 manufactured as the Comparative Examples to have both characteristics excellent in both scattering and film strength, and the performance as antireflection films was not enough.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-061171, filed Mar. 27, 2019, and Japanese Patent Application No. 2020-038643, filed Mar. 6, 2020, which are hereby incorporated by reference herein in their entirety.

What is claimed is:

1. A member, comprising a porous layer in which silicon oxide particles having a fluorine-containing organic acid on a surface thereof are bound with an inorganic binder on a base material,
wherein the fluorine-containing organic acid is at least one selected from the group consisting of heptafluorobutyric acid, nonafluorovaleric acid, and undecafluorohexanoic acid.

2. The member according to claim 1, wherein a content of the fluorine-containing organic acid is 0.1 phr to 8 phr based on the silicon oxide particles.

3. The member according to claim 1, wherein the inorganic binder is a silicon oxide binder.

4. The member according to claim 1, wherein the silicon oxide particles comprise hollow silicon oxide particles or chain-like silicon oxide particles.

5. The member according to claim 1, wherein the porous layer comprises vacant spaces among the silicon oxide particles.

6. An optical device, comprising a case and an optical system comprising a plurality of lenses in the case,
wherein at least one of the lenses is the member according to claim 1.

7. The optical device according to claim 6, wherein the optical device is an image capturing apparatus further comprising an image capturing element which receives light which passes the optical system.

8. The optical device according to claim 7, wherein the image capturing apparatus is a camera.

* * * * *